United States Patent [19]

Elton

[11] Patent Number: 4,723,083
[45] Date of Patent: Feb. 2, 1988

[54] ELECTRODEPOSITED MICA ON COIL BAR CONNECTIONS AND RESULTING PRODUCTS

[75] Inventor: Richard K. Elton, Altamont, N.Y.

[73] Assignee: General Electric Company, Schenectady, N.Y.

[21] Appl. No.: 848,678

[22] Filed: Apr. 4, 1986

Related U.S. Application Data

[60] Division of Ser. No. 702,525, Feb. 19, 1985, Pat. No. 4,615,778, which is a continuation-in-part of Ser. No. 555,058, Nov. 25, 1983.

[51] Int. Cl.$^4$ ............................................. H02K 15/10
[52] U.S. Cl. ....................................... 310/45; 310/260
[58] Field of Search ................. 174/84 R, 104, 116; 204/180.1, 180.2, 180.4, 181.1; 310/45, 260, 42, 43; 427/104, 116, 185

[56] References Cited

U.S. PATENT DOCUMENTS

| | | | |
|---|---|---|---|
| 3,813,294 | 5/1974 | Dyer et al. | 427/116 |
| 3,892,646 | 7/1975 | Lazzarini et al. | 204/180.2 |
| 4,427,740 | 1/1984 | Stackhouse et al. | 310/45 |
| 4,533,694 | 8/1985 | Elton et al. | 204/181.1 |
| 4,615,778 | 10/1986 | Elton | 204/181.1 |
| 4,616,407 | 10/1986 | Tamaki et al. | 310/45 |
| 4,622,116 | 11/1986 | Elton et al. | 204/181.1 |

Primary Examiner—Patrick R. Salce
Assistant Examiner—D. L. Rebsch
Attorney, Agent, or Firm—Jerome C. Squillaro

[57] ABSTRACT

Electrodeposited mica in a water soluble anionic resin binder, such as a modified polyester resin, is a means for applying a heavy coating of a high-voltage, mica-bearing electrical insulation onto uninsulated and insulated portions of electrical connections in dynamoelectric machines. The Electrodeposited mica coating is subsequently impregnated with a suitable resin, such as an epoxy or polyester resin, concurrently with the impregnation of other conventional insulations in the machine. Alternatively, deposition and impregnation of the connection insulation can be performed prior to installing the connection into the machine.

2 Claims, 5 Drawing Figures

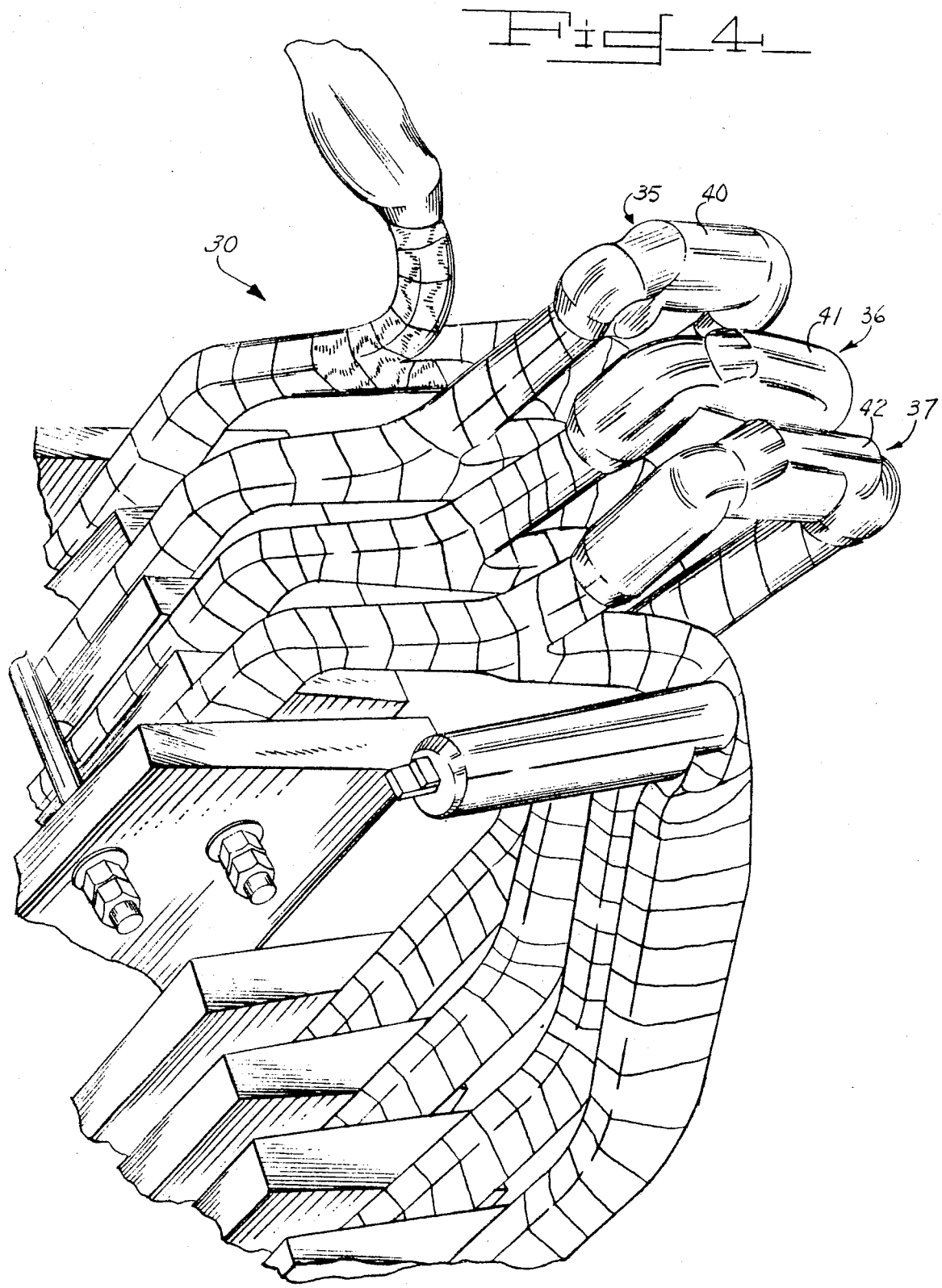
Fig_4_

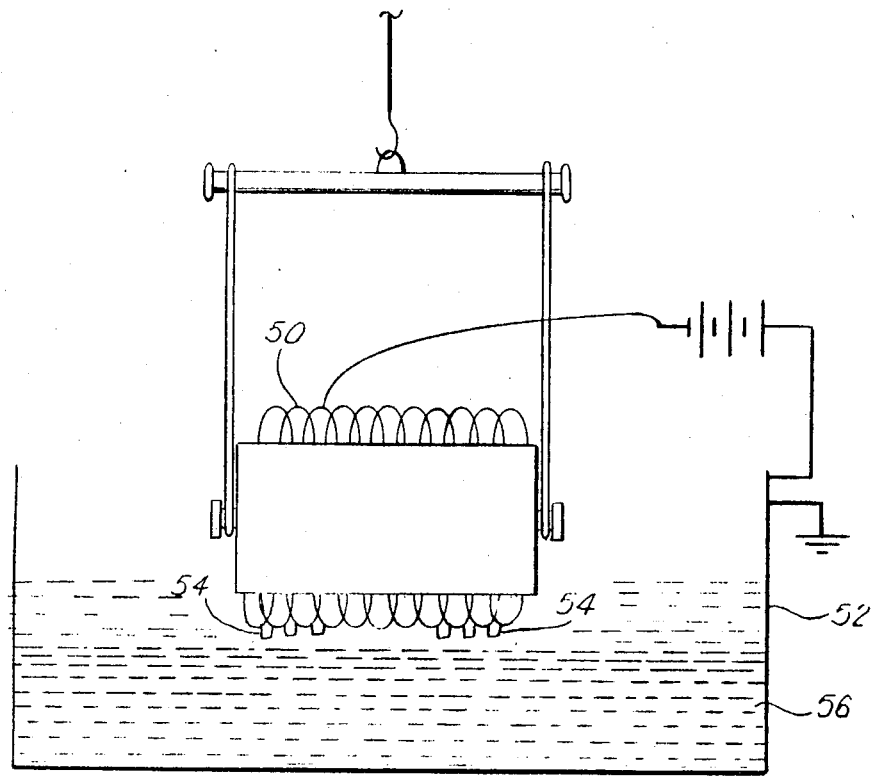
Fig_5

ELECTRODEPOSITED MICA ON COIL BAR CONNECTIONS AND RESULTING PRODUCTS

This application is a division of U.S. patent application Ser. No. 702,525, filed Feb. 19, 1985, now U.S. Pat. No. 4,615,778, which was a continuation-in-part of U.S. patent application Ser. No. 555,058, filed Nov. 25, 1983.

FIELD OF THE INVENTION

The present invention relates generally to the art of electrophoretic deposition, and is more particularly concerned with a novel process for electrodepositing micaceous insulating coatings on end connections for electrical conductors, especially end connections for electrical coils and the like, and with the resulting novel insulated articles and assemblies.

CROSS REFERENCE

This invention is related to that of patent application Ser. No. 672,776, entitled Formulation For Electrodeposition of Mica, filed November 19, 1984 in the names of Richard K. Elton and William R. Schultz, Jr. and assigned to the assignee hereof, which discloses and claims a novel mica-containing composition having special utility in providing insulating coatings on electrical conductors.

BACKGROUND OF THE INVENTION

The connections in a small dynamoelectric machine are typified by the lengths of bare copper wires which join the stator coils in electric motors to each other and to external motor terminals. Insulation of those small connections is usually accomplished by application of micaceous insulating tape after the connections are made from a few strands of wire and fastened together, for example, by brazing. Because in many cases, the actual connection is only several inches long, has an irregular geometry, and is located in crowded part of the machine, the insulation normally has to be applied manually, a very slow and laborious process.

In larger machines, such as hydroelectric or steam turbine-generators, connections are often made using large copper tubes or bars. These connecting parts may be taped and impregnated prior to installation. In any case, however, because of the irregular shapes involved, much or all of the work must be done by hand.

A less complicated, yet effective technique of applying micaceous insulation, without the need for taping, would be of great benefit in the manufacture of dynamoelectric equipment. In addition to savings in labor and time, the cost of materials could be substantially reduced because insulating tape production involving mica paper fabrication, lamination, etc., would be avoided. Also, less expensive wet ground mica might be used instead of the fluid-split or calcined mica required for tape manufacture.

Heretofore, electrodeposition of mica has been a recognized means of providing an electrical insulation coating or covering. Thus, Shibayama et al, U.S. Pat. No. 4,058,444 discloses such a process for providing insulation for coils of rotary machines, mica and a water dispersion varnish being used in a coating bath formulation. Other patents describe the electrophoretic deposition of mica with the use of water dispersion resins in similar manner to bind the deposited mica particles. Japanese patents issued to Mitsubishi Electric Corp. (Japanese Patents Nos. 77 126438; 81 05,868 and 81 05,867) are directed along this same line, but none of them disclose the in situ electrodeposition of mica on electrical connections.

German Patent No. 1,018,088 issued to H. W. Rotter describes the use of electrodeposited mica for insulating electrical connections, and sets forth a coating bath formulation that contains extremely finely divided mica (<1 micron). In addition, the possibility of using a silicone resin emulsion to aid in binding the flakes of mica together is mentioned.

Other applications of electrodeposited mica appear in the patent literature which involve the use of a binder either in the form of a water dispersion polymer or an aqueous emulsion. Objects to be coated such as wires, plates, and perforated plates are mentioned.

None of these prior art procedures have proven to be satisfactory enough to displace the manual technique, with all of its drawbacks. For one reason, the resultant coating compositions are unable to withstand conditions of the manufacturing environment, coalescing or coagulating when agitated or allowed to stand for prolonged periods. Additionally, the emulsions and dispersions used heretofore result in coatings which are not of uniform thickness, particularly on irregularly shaped conductor substrates because the different levels of electrical field strengths cause corresponding variations in insulating coating thickness.

The generally recognized, long-standing demand for answers to these problems, having not been met through any of the concepts disclosed in the foregoing patents or elsewhere in the patent art, has persisted to the present time.

SUMMARY OF THE INVENTION

By virtue of the present invention which is predicated upon the discoveries and concepts set out below, the shortcomings of the prior art can be avoided and new results and advantages can be obtained. Further, these gains can be made and realized without penalty of offsetting disadvantages of economy or efficiency of production, or of product quality, utility or value.

A key concept underlying this invention, as well as the invention of patent application Ser. No. 672,776, is to use in producing by electrodeposition thick (greater than 50 mils) insulation coatings, a formulation in which the binder is contained in solution rather than being dispersed or emulsified in the liquid vehicle of the deposition formulation.

When such a solution is employed instead of a dispersion or emulsion of the prior art, the problem of thick and thin spots in the electrodeposited mica coatings is minimized as coatings of substantially more uniform thickness are consistently produced. Apparently, this is the result of self-limiting effect arising from the fact that depositions on a conductor from a coating bath containing mica and a water soluble binder result in the conductor becoming increasingly passivated which in turn results in decay of the deposition rate exponentially with time. The decay constant of this system, which determines how rapidly this effect develops, can be controlled by varying the concentration of water soluble binder and/or electrolyte in the coating bath. Thus, the high field strength areas of the conductor will begin to accumulate a heavier coating than the low field regions, but will also more quickly become passivated. The low field strength regions do not become passivated as quickly and, consequently, will continue to acquire a coating at an increasingly greater relative rate than the higher field strength regions. More uniform coating thickness is the result.

It has been further found that coating quality can be enhanced and coating deposition rate can be controlled by adding a relatively small amount of an electrolyte to the aqueous coating bath.

As set forth in the aforesaid referenced patent application, the water soluble resin binder must have anionic functionality, that is, only anionic polymers are useful for my purposes and are therefore contemplated by the appended claims. Cationic or nonionic water soluble polymers, unlike anionic-type polymers, are not compatible with mica electrodeposition formulations because they are not attracted to the anode with the mica which in water dispersion acquires a net negative charge.

Water soluble anionic resins having special utility in this invention are polyesters, epoxyesters, acrylics and carboxy-terminated butadiene/acrylonitrile resins. It will be understood, however, that others may be used together with or in place of these, and that typically such a resin has an acid number (indicating carboxy group content) from 20 to 120 and that it is rendered water soluble by reaction with a substituted amine or other suitable base.

Still another concept of the invention is to impregnate the porous, dry, micaceous coating resulting from the electrodeposition from the aqueous mica containing bath. Thus, with the mica flakes being held together as deposited as a coating, resin varnish is applied to the coating and the impregnated coating is baked to cure the resin varnish.

I have further discovered that when the process of this invention is carried out on a conductor which is insulated as by tape wrapped over a portion of the conductor length, the uninsulated bare portion and the immediately adjacent part of the conductor are covered with a continuous crack-free coating of electrodeposited insulating material. This discovery led me to the novel concept of insulating the series leads of motor coil assemblies by the process of immersing the bare lead portions and adjacent insulated lead portions in an electrodeposition bath and then electrodepositing a coating of insulating material on not only the bare exposed coil connection parts of the assembly, but also on the adjacent insulated parts thereof to provide overlapped insulation at each coil end connection. A related new concept of mine is to apply insulation to other electrical conductor components of dynamoelectric machines such as pole jumpers for hydrogenerators and similar equipment in which high integrity of the insulating cover material is essential over the full length of the conductor component and its connections.

Briefly stated, then, in its process aspect the present invention generally comprises the sequential steps of immersing bare electrical connections and/or terminals between an end portion of a wire member in coil form or otherwise and another conductor in an aqueous electrodeposition composition containing mica particles, a water soluble anionic resin binder, an electrolyte and a nonionic surfactant; electrodepositing a coating from the bath on the bare electrical connections to provide a micaceous coating which, when dried, is porous and contains sufficient binder to hold the particles together in place on the substrate; next, the porous coating is impregnated with resin varnish; and finally the impregnated coating is heated to an elevated temperature to cure the resin varnish. This process accordingly is a new combination of procedural steps including the new step involving the use of the new composition disclosed and claimed in the above-referenced patent application.

In more specific terms this new process includes the preliminary step of wrapping a portion of the length of the conductor with insulating material, suitably in the form of tape, and immersing the so insulated part of the conductor and the uninsulated adjacent part in the electrodeposition formulation, and then electrodepositing a coating of insulating material from the said formulation on the bare portion and on the immediately adjacent insulation-covered portion of the conductor to provide a continuous crack-free coating of high integrity.

In its product aspect this invention is in general the article or the assembly resulting from the application of the present novel process to electrical conductors generally and especially to those carrying an insulating cover over part of their lengths. Thus an electric motor assembly of insulated coils connected at their ends in series by coil leads which are in part bare and uninsulated as installed is provided with continuous crack-free insulation on each coil lead which overlaps and is bonded securely to the insulation on the coil lead as well as to the exposed metal surface thereof.

BRIEF DESCRIPTION OF THE DRAWINGS

Those skilled in the art will gain a further and better understanding of this invention from the following detailed description of it, taken in conjunction with the drawings accompanying and forming a part of this specification, in which

FIG. 4. is a perspective view of the formette of FIG. 3 after insulation has been electrodeposited in accordance with the process of this invention to provide continuous crack-free insulation covering the unwrapped portions and overlapping the wrapped portions of the coil leads; and, FIG. 5 is a partially diagrammatic sketch of an electrodeposition operation for applying insulating coatings to the bare portions of the series connections of an electric motor stator in accordance with preferred practice of this invention.

DETAILED DESCRIPTION OF THE INVENTION

Figure 1:
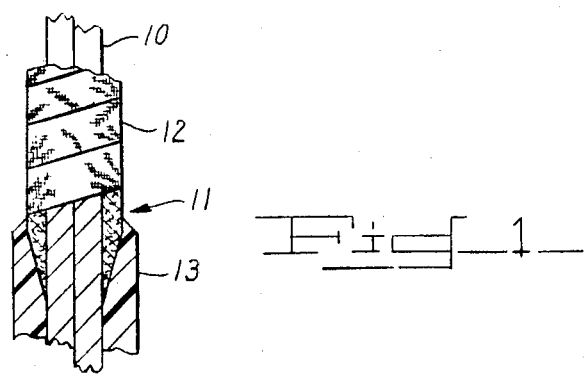
FIG. 1 is a longitudinal sectional view of an electrical conductor wrapped with insulating tape over part of its length and covered with electrodeposited insulation by the method of this invention, the novel insulation overlap feature being readily apparent.

As illustrated in FIG. 1 a conductor in the form of a copper bar is provided with continuous, crack-free insulating cover 11 consisting of a combination of mica tape 12 wrapped around conductor 10 over a part of its length and electrodeposited mica insulation coating 13 covering and bonded directly to the unwrapped, bare part of the conductor. As an important consequence of electrodepositing insulation coating 13 in strict compliance with the process of this invention as described above, the interface between the taped and bare parts of conductor 10 is covered by coating 13. Thus the coating overlaps tape 12, extending approximately as far beyond the said interface as the thickness dimension of coating 13 on the bare part of the conductor. As shown, coating 13 is of substantially uniform thickness over the bare metal, but tapers at about 45° from the interface to the end over tape 12. Further, as indicated elsewhere herein, the thickness of coating 13 is largely a matter of the operator's choice, as this invention enables electrodeposition of coatings of high integrity and uniformity of thickness 50 to 150 mils or more.

Figure 2:
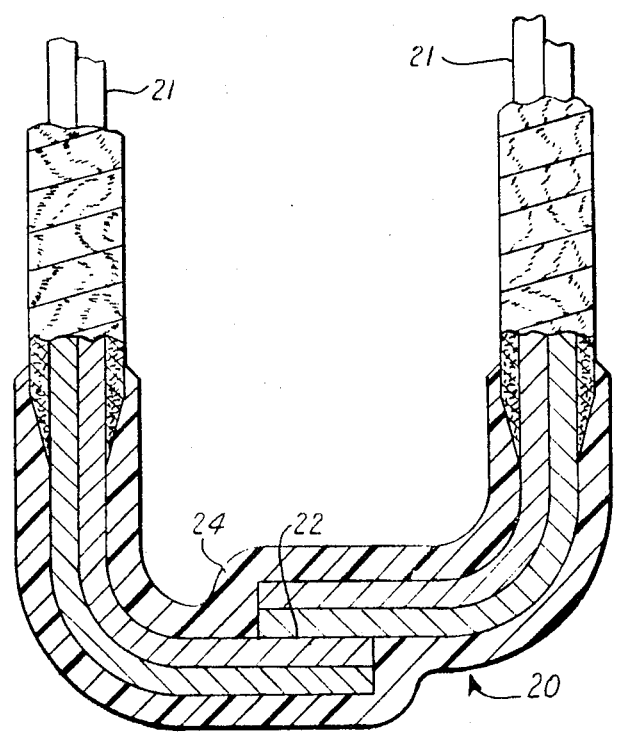
FIG. 2 is a view like that of FIG. 1 of an electric motor series connection the lead portions of which are wrapped with insulating tape while the central or junction portion is covered by electrodeposited insulation which overlaps and is securely bonded to the insulating tape.

In the case of series connection 20 of FIG. 2, lead portion 21 is wrapped with mica tape insulation and the central or junction portion 22 is covered with a coating 24 of electrodeposited mica insulation. Again the insulation over the full length of connection 20 is continuous and crack-free because coating 24 bridges over the interface region between wrapped and bare parts of the series connection and is securely bonded to both. In this instance the overlap is approximately 100 mils, which is the thickness of coating 24 on the unwrapped or bare part of the element.

Figure 3:
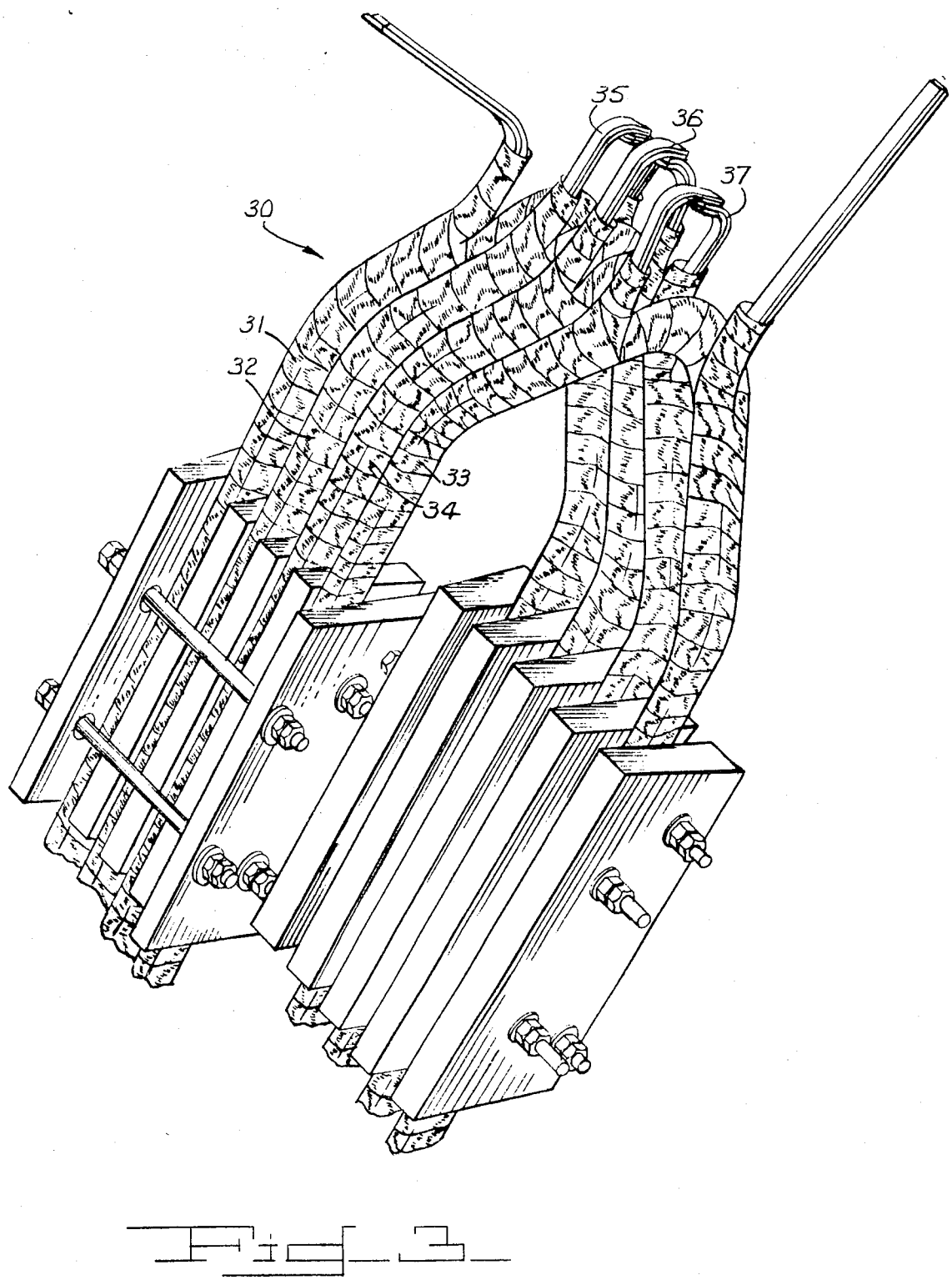
FIG. 3 is a view in perspective of a four-coil formette of an electric motor stator with the coils and portions of the leads wrapped with insulating tape while bound connection portions of the leads are bare.

Coil formette 30 of FIG. 3 comprises four coils 31, 32, 33 and 34 and three series connections 35, 36 and 37. As in the case of series connection 20 of FIG. 2, these three are wrapped to some extent with the mica tape insulation which covers the four coils. The junctions of connections 35, 36 and 37 are not wrapped at the stage of assembly illustrated in this view.

Completion of the insulation system of the assembly of FIG. 3 is again accomplished in accordance with preferred practice of the process of this invention with the result shown in FIG. 4. Thus series connections 35, 36 and 37 of formette 30 are insulated by electrodeposited coatings 40, 41 and 42, respectively. Those coatings, like coating 24 on series connection 20, are each of substantially uniform thickness about 100 mils and crack-free and continuous. Further, as a consequence of these coatings being formed as described above by an operation involving dipping of the formette in an electrodeposition bath of the kind specified herein, the ends of each coating have the geometry of coating 13 of FIG. 1, overlying the mica tape insulation and bridging across the interface between the taped and untaped parts of the series connection.

The dipping operation just mentioned is illustrated in FIG. 5 in which an electric motor stator 50 is suspended in coating vessel 52 with series connections 54 of the motor coils immersed in electrocoating solution bath 56. The depth of this immersion is sufficient to insure that the tape insulation on the series connections is submerged to at least the extent that overlap of electrodeposited insulation is desired, then D.C. potential is applied to the system with vessel 52 serving as the ground and the power source suitably being a D.C. generator.

The compositional range of the electrodeposition bath in accord with the invention in weight percent is summarized below:

| Component | Broad Range | Preferred Range |
| --- | --- | --- |
| Mica | 5–35% | 10–16% |
| Soluble Resin Binder (as solids) | 0.2–2% | 0.5–1.5% |
| Electrolyte | 0.001–0.20% | 0.002–0.05% |
| Nonionic Surfactant | 0–0.3% | 0.03–0.10% |
| Water | Balance | Balance |

Mica types and particle sizes useful in the process of this invention include those specified in the above-referenced patent application. Likewise, soluble resin binders, electrolytes and polar solvents useful in this process include those set forth in that patent application. Accordingly, those portions of the specification of said above-referenced application describing those constituents of electrodeposition both useful in the present process are hereby incorporated herein by reference.

The electrical connection or group of connections to be insulated are coated by electrodeposition. The connection is immersed in the aforementioned bath. A direct current (D.C.) potential is applied to the conductor in the connection, typically in the range of +20 to +150 volts. Simultaneously, a grounded counterelectrode must be present in the bath. The mica flakelets in suspension are attracted to the anodic connection and are deposited there as long as current flows from it. The organic binder also codeposits with the mica flakes. Typical deposition times range from 20 to 500 seconds, depending on the binder, electrolyte concentrations and the thickness of the insulation coating desired.

The interface between the electrodeposited mica and the taped insulation is the region of greatest difficulty in achieving a consolidated, crack-free insulation, due to the properties of the two dissimilar insulation materials. In some instances depending on the type of mica tape used, better adhesion, between the electrodeposited mica and the tape, can be accomplished when a nonionic surfactant, i.e., one that does not undergo migration in an electric field, is incorporated into the deposition bath. A typical nonionic surfactant is Tergitol NPX (alkyl phenyl ether of polypropylene glycol), available from Union Carbide Corporation.

When enough mica has been deposited, the D.C. current is switched off and the connection is removed from the bath. The initial wet coating on the connection is a composite of mica flakelets, binder solids and water. This coating is allowed to dry at a temperature greater than 0° C. and less than 100° C., but preferably from about 25° C. to about 75° C. The residual water is baked out in an oven at an elevated temperature. At the same time the elevated temperature serves to cure the binder. The result is a dry, micaceous coating which is porous and contains enough binder to hold the mica flakes together.

The next step is a post-impregnation treatment of the porous coating, in which the connection is either dipped into an impregnating varnish or, more preferably, treated by vacuum-pressure impregnation with a suitable epoxy or polyester resin. This impregnation treatment can, in many instances, be part of the same cycle whereby other conventional insulations in the dynamoelectric machine are also being resin treated. Frequently in the actual dynamoelectric machine there are two such post impregnation treatments.

The final step consists of an elevated temperature bake to cure the impregnated resin. Generally, the curing step includes heating to a temperature of 150° to 180° C. for a time of four to six hours. Longer curing times can be used, but are usually not necessary. The higher the temperature the shorter the time required for a satisfactory cure. A typical curing step is at a temperature of 160° C. for a time of six hours.

The resulting product is a micaceous connection insulation, consolidated and void-free. This procedure has the advantages of using low-cost mica and eliminating all taping operations in the connection region. In instances in which a wire or coil terminal is to be connected to a wire or coil and then used as a connector, it may be taped over initially with a suitable tape and after the plating process is complete the underlying tape and the insulation deposited thereover may be removed.

The invention is further described by the following examples in which all mesh is given in U.S. Standard sieve sizes and all percentages are given in weight percent.

EXAMPLE I

A representative model of a conventional high-voltage motor coil connection was made by overlapping two rectangular copper strips about ½" and brazing them together. This joined connection was then bent in the shape of a "U", and insulated with conventional mica tapes on the ends only. To insulate the bare copper portion, the connection model was immersed in a metal vessel containing a bath of the following composition: 900 grams of 325 mesh wet ground muscovite mica powder; 170 grams of a water soluble polyester resin varnish, available as Sterling WS-200 WAT-A-VAR, from Reichold Chemicals, Inc.; 2 grams of ammonium nitrate electrolyte, and enough distilled water to bring the volume up to 2 gallons.

The model was immersed in the bath for a period of 2 minutes to eliminate air from the submerged taped insulation portion. Using a metal vessel as the ground, an anodic potential of 60 volts D.C. was applied for 350 seconds to deposit the mica and binder. Thereafter the model was dried for 15 hours at 25° C. and baked 6 hours at 160° C. It was subsequently vacuum-pressure impregnated with an accelerated version of an epoxy resin consisting in weight percent of about a 60% cycloaliphatic and 40% a liquid Bisphenol A-diglycidyl ether epoxy, as disclosed in Markovitz U.S. Pat. No. 3,812,214. Thereafter, the epoxy was cured 6 hours at 160° C.

The result was the deposition of a smooth, uniform insulation, about 125 mils thick, coating the bare portion, and two overlapping portions that rise over the conventionally taped insulation by about 120 mils. The mica content of the coating was determined to be 36.9%. The two overlapping portions between the electrodeposited and conventional insulation were wrapped with a 2" metal foil, and when subjected to electrical testing, it was found that over 35,000 volts at 60 Hz were applied, between the copper strips and foils, without failure of the insulation.

EXAMPLE II

A high-voltage connection model was prepared from a rectangular copper strip by insulating half of its length with conventional mica tape. The following bath was prepared for coating the bare copper portion of this strip: 7,500 grams of 325 mesh wet ground muscovite mica powder; 900 grams of a water soluble polyester varnish, available as Aquanel 513 from Schenectady Chemicals, Inc.; 17 grams of basic aluminum acetate (stabilized with boric acid); 7 grams of ammonium nitrate, and enough distilled water to bring the volume up to 32 liters.

The model was immersed for several minutes to eliminate air from the taped insulation, and then an anodic potential of 60 volts D.C. was applied for 105 seconds. The model was then removed and dried at 25° C. overnight, and baked 6 hours at 160° C. It was subsequently vacuum-pressure impregnated with an epoxy resin as described in Example I, and cured for 6 hours at 160° C.

The result was a uniform void-free micaceous insulation about 200 mils thick, and overlapping the upper portion of the mica tape insulation by about 200 mils. A metal foil was wrapped over the interface, and electrical failure did not occur until a potential of 40,000 volts at 60 Hz was reached.

EXAMPLE III

A connection model for a large generator was prepared by soldering together 3 lengths of 1⅛" o.d. copper tubing in the shape of a "T".

A bath for coating this object was prepared as follows: 5,600 grams of 325 mesh wet ground muscovite powder; 560 grams of Aquanel 513 soluble polyester varnish; 17.5 grams of basic aluminum acetate (stabilized with boric acid), and enough distilled water to bring the volume up to 34 liters.

The "T" shaped object was then immersed in this bath, and an anodic potential of 60 volts D.C. was applied for a period of 300 seconds. Thereafter, the object was removed and allowed to dry at 25° C. for 24 hours. It was then baked 6 hours at 160° C., and subsequently impregnated with the epoxy resin, as and according to the procedure described in Example I. The final cure was for 6 hours at 160° C.

This process resulted in a uniform micaceous insulation on the outside surface of the copper tubing which was about 75 mils thick and contained about 35% mica. When the region about the corners of the "T" were wrapped with metal foil, voltage was applied up to 25,000 volts without failure.

EXAMPLE IV

A multiple coil motor model, known as a formette, was constructed using 4 motor coils placed in a fixture similar to the stator of a high-voltage motor. These coils were insulated with conventional mica tapes and wrappers, except for the leads, which consisted of bundles of six bare rectangular copper wire. The leads were joined in series from one coil to the next by brazing, resulting in 3 bare series connections. A bath for electrodeposition of mica onto these leads was prepared by mixing the following constituents: 1,800 grams of 325 mesh wet ground muscovite powder; 340 grams of Sterling WS-200 WAT-A-VAR water soluble polyester varnish; 4 grams ammonium nitrate electrolyte, and enough distilled water to bring the volume up to 4 gallons.

The end region of the formette was immersed in the bath so that all of the bare copper connections were submerged. An anodic potential of 70 volts D.C. was applied for 270 seconds. Thereafter the formette was removed, dried at 25° C. for 24 hours, and then baked for 6 hours at 160° C. Following this, the electrodeposited insulation along with the conventional taped insulation was impregnated with an epoxy resin as disclosed in Example I. The resin was then cured for 6 hours at 160° C.

The result was a continuous insulation around the coil connections about 110 mils thick and overlapping the taped insulation by about 100 mils.

EXAMPLE V

Three high-voltage motor connection models were prepared by bending 15" copper strips in the shape of a "U", and insulating the ends with mica tapes, similar to the method described in Example I. A coating formulation was prepared in a metal vessel by mixing the following constituents: 900 grams of 325 mesh wet ground muscovite mica powder; 170 grams of Aquanel 550 water soluble polyester varnish; 2 grams of ammonium nitrate; 4 grams of Tergitol NPX nonionic surfactant available from Union Carbide Corporation, and enough distilled water to bring the total volume up to 2 gallons.

The bare copper portion of each model was coated by immersing the model in the bath and applying an anodic potential of 60 volts D.C. for a period of 180 seconds. Thereafter, the objects were allowed to dry overnight at 25° C., and then baked 6 hours at 160° C. Following this, they were vacuum-pressure impregnated with an epoxy resin as described in Example I, and cured 6 hours at 160° C.

The foregoing resulted in a smooth uniform micaceous insulation about 120 mils thick and overlapping the taped insulation by about 130 mils. The insulation integrity was tested by applying 9000 volts at 60 Hz between the outside surface and the copper, and found to pass without failure. Thereafter, the models were thermally cycled by repeatedly passing current through the copper to heat it to 190° C., and subsequently permitted to cool in air to 30° C. After 2000 such cycles, the models were tested by immersion in water containing a wetting agent for 30 minutes. Then 4600 volts at 60 Hz were applied to the submerged samples without any dielectric failure occurring.

EXAMPLE VI

Three high-voltage motor connection models were prepared as described in Example V. A coating formulation was prepared by mixing the following constituents in a metal vessel: 900 grams of 325 mesh wet ground muscovite mica powder; 170 grams of Aquanel 513 water soluble polyester varnish; 2 grams of ammonium nitrate; 4 grams of Tergitol NPX nonionic surfactant; and enough distilled water to bring the total volume up to 2 gallons.

The bare copper and insulated portions of each model were coated by immersing the model in the bath, and applying an anodic potential of 60 volts D.C. for a period of 140 seconds. Thereafter, the objects were allowed to dry overnight at 25° C. and then baked 6 hours at 160° C. Following this they were vacuumpressure impregnated with an epoxy resin as described in Example I, and cured 6 hours at 160° C.

This resulted in a smooth uniform micaceous insulation about 130 mils thick, and overlapping the taped insulation by about 130 mils. The insulation was tested by applying 9000 volts at 60 Hz as in Example V, without failure. The models were thermally cycled from 190° C. to 30° C. for 2000 times as in Example V and tested at 4600 volts at 60 Hz under water after 30 minutes submersion, without failure. One model was then placed back on the thermal cycling test for an additional 3136 cycles, removed, and submerged under water. It passed the 4600 volt test.

EXAMPLE VII

A formulation of the coating composition of the present invention was prepared by mixing the following ingredients: 5,600 grams of 88 mesh muscovite mica powder available from Franklin Minerals, Inc., 560 grams Aquanel 513 water soluble insulating varnish available from Schenectady Chemicals, Inc. (28% solids of an oil modified polyester), 2.5 grams sodium chloride, and enough distilled water to bring the bath volume up to 34 liters.

A rectangular copper wire, 0.162"×0.322" cross section, was immersed in the coating formulation coaxial with respect to a 3 inch copper tube at ground potential. Mica and binder were electrodeposited on the wire by applying an anodic potential of 60 volts D.C. for 80 seconds. The coated wire was removed from the bath and dried at 25° C. for 15 hours, and the binder cured at 165° C. for 4 hours, resulting in a porous micaceous coating.

Thereafter, the coating was vacuum/pressure impregnated with an epoxy resin consisting of 60% cycloaliphatic and 40% Bisphenol A epoxy, as disclosed in Markovitz, U.S. Pat. No. 3,812,214. The epoxy was cured for 6 hours at 160° C. to yield a consolidated, voidfree insulation 30 mils thick containing 40.4% mica. The insulation was voltage endurance tested by wrapping the insulated wire spirally with a 40 mil bare Cu wire and applying 7,500 volts at 60 Hz. The insulation survived the corona and voltage stress for 5,035 hours.

EXAMPLE VIII

Following the procedure of Example VII, a formulation was prepared consisting of 900 grams of 325 mesh muscovite powder, 200 grams of Aquanel 513 water soluble polyester varnish, 2 grams ammonium nitrate, diluted to 2 gallons with distilled water and stored in a tin coated steel container.

A test sample was prepared from two parallel copper bars, having rectangular cross sections of 1 inch×¼ inch, and 6 inches in length. The bars were separated by two ⅜ inch thick phenolic spacers placed at either end of the bars and the bars were bolted together. The sample was then immersed in the coating formulation. Mica and binder were deposited thereon by applying an anodic potential of 100 volts D.C. for a time of 400 seconds. The metal container was grounded and became the cathode of the electrical deposition system. The bars were removed and dried 15 hours at 25° C., then 6 hours at 105° C., and finally 6 hours at 160° F. Thereafter, the bars were vacuum/pressure impregnated with an accelerated version of the epoxy resin disclosed in Example I, and the resin cured at 160° C. for 6 hours. The resulting insulation measured 130–137 mils thick on the outside faces of the bars and 102–107 mils on the inner faces. This represents a reduction in insulation thickness of only about 15% in the electrically shielded region.

This example demonstrates how an improved uniformity of insulation build can be achieved in regions where electrical shielding or enhancement occurs simply by adjusting the concentration of water soluble binder.

As a comparison, the same copper bar configuration immersed in a bath containing the same constituents as in Example IV and 100 grams of Aquanel 513 instead of 200 grams results in insulation builds of 252 mils and 85 mils on the outer and inner faces, respectively. Here, a reduction in thickness of 66% occurs in the shielded region.

EXAMPLE IX

In order to compare the effects of using water soluble resins versus water dispersed resins in the electrodeposition of mica, test samples of two parallel copper bars (designated as bar X and bar Y) were prepared having the dimensions and configuration as described in Example VIII. Electrodeposition baths were prepared consisting of 2 pounds of 325 muscovite, 2 grams of ammonium nitrate, 114 grams (on a solid basis) of resin and two gallons of distilled water.

The resin systems compared in the above formulation were as shown in the following table. In the subsequent discussion and tabulation of the experimental results, the electrodeposited samples are identified by the designation of the resin system used.

TABLE II
Resin System

A. Water Soluble Resins
- A1. Aquanel 513, a water soluble polyester, commercially available from Schenectady Chemical Company.
- A2. Aquanel 550, a water soluble polyester, commercially available from Schenectady Chemical Company.
- A3. GE 111-244, a water soluble polyester, available from General Electric Company.

B. Water Dispersion Resins
- B1. Rhoplex TR-407, an acrylic dispersion resin, commercially available from Rohm and Haas Company.
- B2. Rhoplex AC-1533, an acrylic dispersion resin, commercially available from Rohm and Haas Company.
- B3. Rhoplex AC-1822, an acrylic dispersion resin, commercially available from Rohm and Haas Company.
- B4. Cavalite, an acrylic dispersion resin, commercially available from E. I. DuPont De Nemours and Company.

Mica and binder were electrodeposited on the wire by applying an anodic potential of 80 volts D.C. for a time of 180 seconds with the exception that the time in sample B2 was 130 seconds and the sample B4 was 120 seconds.

In all cases the outer coating was thicker than the inside coating, due to an electrical shielding effect. In the case of water soluble resin coatings, improved thickness uniformity between the inside and the outside as indicated by the ratio of I/O resulted. Water dispersion resins, on the other hand were much more influenced by the electrical shielding effect as indicated by a significantly lower ratio of I/O.

The results are shown in the following table:

TABLE III

| Resin System | Bars | Inside Thickness, I (mils) | Outside Thickness, O (mils) | Ratio I/O |
|---|---|---|---|---|
| A. Water Soluble Resins | | | | |
| A1. Aquanel 513 | X | 70 | 98 | .71 |
| | Y | 78 | 99 | .79 |
| A2. Aquanel 550 | X | 57 | 98 | .58 |
| | Y | 60 | 98 | .61 |
| A3. GE 111-244 | X | 80 | 102 | .78 |
| | Y | 88 | 112 | .79 |
| B. Water Dispersion Resin | | | | |
| B1. Rhoplex TR-407 | X | 19 | 49 | .39 |
| | Y | 19 | 52 | .37 |
| B2. Rhoplex AC-1533 | X | 42 | 135 | .31 |
| | Y | 48 | 120 | .40 |
| B3. Rhoplex AC-1822 | X | 45 | 105 | .43 |
| | Y | 54 | 115 | .47 |
| B4. Cavalite | X | * | * | * |
| | Y | * | * | * |

*Coating did not adhere to test bars and no measurements were possible.

Similar test bars to those used in the thickness test were also prepared, and subjected to a rinse under running water from a faucet. Sample A1, A2, and A3 remained adherent to the bars. Sample B4 could not be evaluated since it had insufficient adhesion to the bar. Sample B3 washed off easily. Samples B1 and B2 washed off partially, leaving exposed portions of copper, and reduced coating thicknesses in other places.

EXAMPLE X

The utility of water soluble epoxyesters in accordance with this invention was tested by preparing a one gallon aqueous bath of the following ingredients:
1 lb. of 325 mesh mica
110 grams Isopoxy 771 (Schenectady Chemicals)
1 gram $NH_4NO_3$
2 grams Tergitol NP10 surfactant A copper bar was immersed in this bath at room termperature and maintained at +60 volts for 240 seconds whereupon the bar was removed, dried 24 hours at 25° C. and then baked 6 hours at 160° C. The bar was then impregnated by vacuum pressure impregnation technique with an epoxy resin and then baked at 160° for 6 hours to cure the epoxy resin. The result was found to be a uniform coating of about 0.210 inch and was void free and of mica content approximating 40 percent. Thus, this coating compared favorably with that produced as described above in Example VII.

EXAMPLE XI

The suitability of water soluble acrylics was similarly tested in another experiment in which a two gallon aqueous bath was prepared by adding the following to water:
2 lbs. of 325 mesh mica
360 grams Acrysol WS-68 acrylic resin (Rohm and Haas)
4 grams Tergitol NP10 surfactant
2 grams Sodium Lauryl sulfate
2 grams Dimethylaminoethanol Again, a copper bar was immersed in this bath and held at +60 volts for 300 seconds whereupon the bar was removed and treated as in Example X with the consequence that a coating of uniform thickness approximating 0.200 inch was produced having a mica content of about 40 percent and being void free and comparing again favorably with the insulating coating described above in Example VII.

EXAMPLE XII

A one gallon aqueous bath was prepared by adding the following to water:
1 lb. of 325 mesh mica
65 grams Carboxy-terminated butadiene/acrylonitrile (B. F. Goodrich)
2 grams $NH_4NO_3$
2 grams Tergitol NP10
1 gram Sodium Lauryl sulfate This, thus, was a test of the suitability in accordance with this invention of the so called CTBN resins which are as described above blended in 65 grams of butyl cellosolve and reacted with 4.6 grams dimethylaminoethanol to render them water soluble. As in Examples X and XI, a copper bar was immersed in this bath and held at 45 volts for 150 seconds then removed and processed as described in Example VIII with the result that a uniform coating of about 0.12 inch thickness resulted. This insulating coating was found to be void free and to have a mica content approximating 40 percent and to be therefore quite similar to those of Example VII, VIII and IX above.

EXAMPLE XIII

To test the suitability of combinations of these anionic water soluble resins for the purposes of this invention, a four gallon aqueous bath was prepared by adding Acrysol WS-68 and Aquanel 513 in a ratio to each other about 1.5 to 1, the actual formulation being as follows:
480 grams Acrysol WS-68 acrylic resin
340 grams Aquanel 513 polyester resin
8 grams Tergitol NPID
4 grams Sodium Lauryl Sulfate
8 grams Dimethyl-amino-ethanol
5 grams Ammonium Nitrate
and the balance water.

Once again, the copper bar test as described in Example VIII was carried out with successful results in terms of the resulting insulating coating being of uniform thickness approximating 0.21 inch and of mica content approximating 40 percent and being void free and altogether a superior electrical insulating coating of the sort described above in Example VII.

EXAMPLE XIV

The utility of non-ionic polymer in this invention was tested in an experiment involving the use of
1 lb. of 325 mesh mica
75 grams of polyethyleneglycol (average mica weight 6,000)
1 gram of ammonium nitrate The mixture was added to one gallon of water and a copper bar test was run as described above in Examples X–XIII. Thus, the copper bar was immersed in this bath and a potential of 60 volts D.C. was applied for about one minute the bar being then removed and found to be completely clean. There was no mica adherence to the bar at all and the polymer was found of itself to be insufficient to hold the mica particles together.

EXAMPLE XV

The suitability of a cationic polymer was similarly tested in experiments which involved formulation of
1 lb. of 325 mesh mica
2 grams of $NH_4NO_3$
80 grams of Poly-2-vinylpyridine dissolved in 80 milliliters of butyl cellosolve
20 grams of acetic acid The mixture was prepared in a volume of one gallon with water and agitated for 30 minutes in a paint shaker to allow the ingredients to disperse and the acid to react with the Poly-2-vinylpyridine to form a polyelectrolyte. Then two copper strips were immersed in the bath spaced about two inches apart, the potential of 60 volts D.C. was applied to the strips. Immediately mica was observed to begin accumulating about the anode while at the cathode a gelatinous accumulation was observed. After 60 seconds, the voltage was dropped to zero and the strips were removed. The mica deposit at the anode having no binder slipped off the wire and could not be removed from the bath, thus demonstrating the generic inability of cathodic deposition resins to bind or hold material deposited at the anode.

The data obtained from these tests substantiate the fact that in electrodeposition of mica, improved results can be obtained using anionic water soluble resins as compared to water dispersion resins and to non-ionic and cationic water soluble resins.

In this specification and in the appended claims wherever percentage or proportion are stated, reference is to the weight basis unless otherwise specifically noted.

It will be appreciated that the invention is not limited to the specific details shown in the illustrations, and that various modifications may be made within the ordinary skill in the art without departing from the spirit and scope of the invention.

What is claimed is:

1. In an electric motor assembly including a plurality of insulated coils connected in series by brazing, the combination of electrodeposited insulation covering the brazed free ends of the coil leads overlapping coil insulation adjacent thereto, the electrodeposited insulation in each instance being electrodeposited from an aqueous bath consisting of 5–35% of particulated mica, 0.2–2% of a water soluble polyester resin binder as calculated in resin solids, 0.001–0.20% of an electrolyte, up to 0.3% of a non-ionic surfactant and the remainder water, the electrodeposited insulation being in contact with both with coil lead insulation and coil lead exposed metal surface and being continuous and crack free and of substantially uniform thickness greater than about 50 mils on the brazed ends of the leads but tapering in thickness on the coil insulation.

2. The assembly of claim 1 in which the electrodeposited coating on the brazed ends of the coil leads is about 120 mils in thickness and extends about 130 mils in length over the coil insulation.

* * * * *